United States Patent
Ericson et al.

(10) Patent No.: US 6,853,333 B2
(45) Date of Patent: Feb. 8, 2005

(54) DOWNLINK LOAD SHARING BY BEAM SELECTION

(75) Inventors: Marten Ericson, Lulea (SE); Bo Hagerman, Stockholm (SE); Bo Goransson, Stockholm (SE); Sven Petersson, Savedalen (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 10/661,883

(22) Filed: Sep. 12, 2003

(65) Prior Publication Data

US 2004/0056795 A1 Mar. 25, 2004

Related U.S. Application Data

(62) Division of application No. 10/185,746, filed on Jun. 28, 2002, now Pat. No. 6,667,712.
(60) Provisional application No. 60/331,666, filed on Nov. 20, 2001.

(51) Int. Cl.[7] .................................................. H01Q 3/02
(52) U.S. Cl. ...................... 342/374; 342/354; 455/277.1
(58) Field of Search .......................... 342/81, 154, 157, 342/354, 374; 455/277.1, 562.1

(56) References Cited

U.S. PATENT DOCUMENTS

| | | | | |
|---|---|---|---|---|
| 4,188,578 A | * | 2/1980 | Reudink et al. | 370/323 |
| 4,204,093 A | * | 5/1980 | Yeh | 370/323 |
| 4,318,104 A | * | 3/1982 | Enein | 342/372 |
| 5,276,907 A | | 1/1994 | Meidan | |
| 5,889,494 A | | 3/1999 | Reudink et al. | |
| 6,094,166 A | * | 7/2000 | Martek et al. | 342/374 |
| 6,097,267 A | * | 8/2000 | Hampel | 333/128 |
| 6,246,674 B1 | | 6/2001 | Feuerstein et al. | |
| 6,453,176 B1 | * | 9/2002 | Lopes et al. | 455/562.1 |
| 6,667,712 B2 | * | 12/2003 | Ericson et al. | 342/354 |

FOREIGN PATENT DOCUMENTS

| | | |
|---|---|---|
| GB | 2309858 | 8/1997 |
| GB | 2349045 | 10/2000 |
| WO | WO 96/38011 | 11/1996 |
| WO | 01/56187 | 8/2001 |

OTHER PUBLICATIONS

Ramiro–Moreno, et al., "Directional Power Based Admission Control for WCDMA Systems Using Antenna Array", May 2001, 5 pps, Proceedings of the IEEE Vehicular Technology Conference.

* cited by examiner

Primary Examiner—Dao Phan

(57) ABSTRACT

The beam pattern associated with a multi-beam antenna array is adjusted if a first beam of the beam pattern is overloaded. A lobe of a second beam of the beam pattern can be steered away from a main lobe of the first beam. Also, if a user is located in an area covered by a second beam which is adjacent to the first beam, a third beam of the beam pattern can be selected for effectuating communication with the user. If a user is located in an area covered by the first beam, another beam of the beam pattern can be selected for effectuating communication with the user.

12 Claims, 5 Drawing Sheets

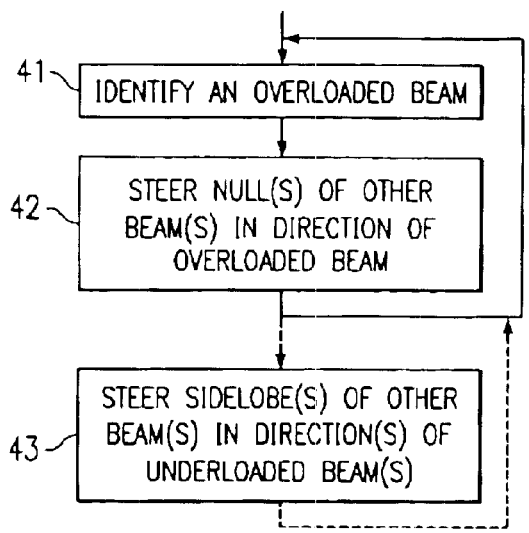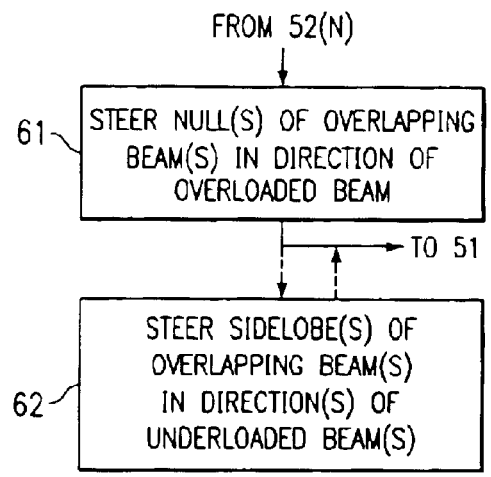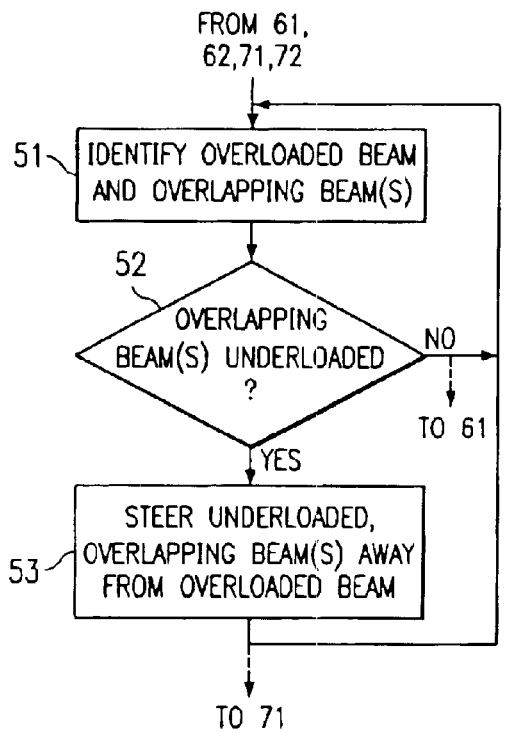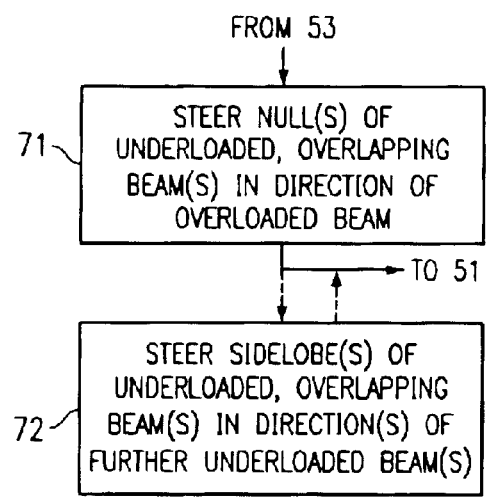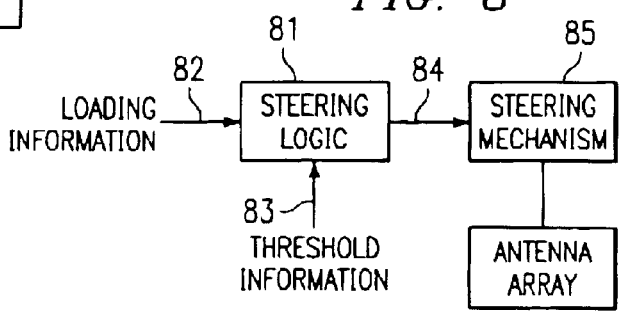

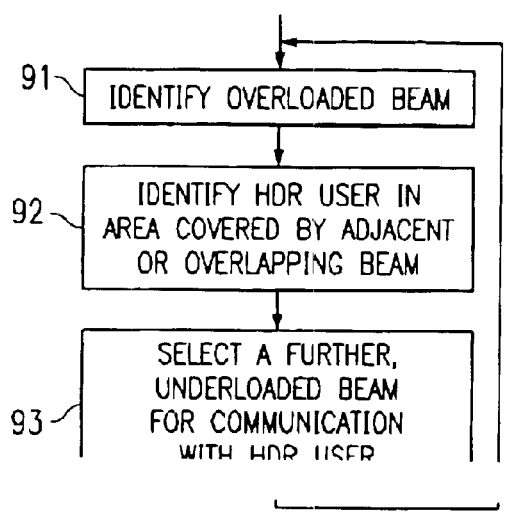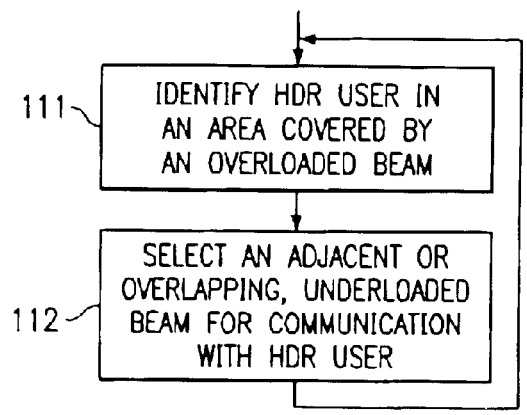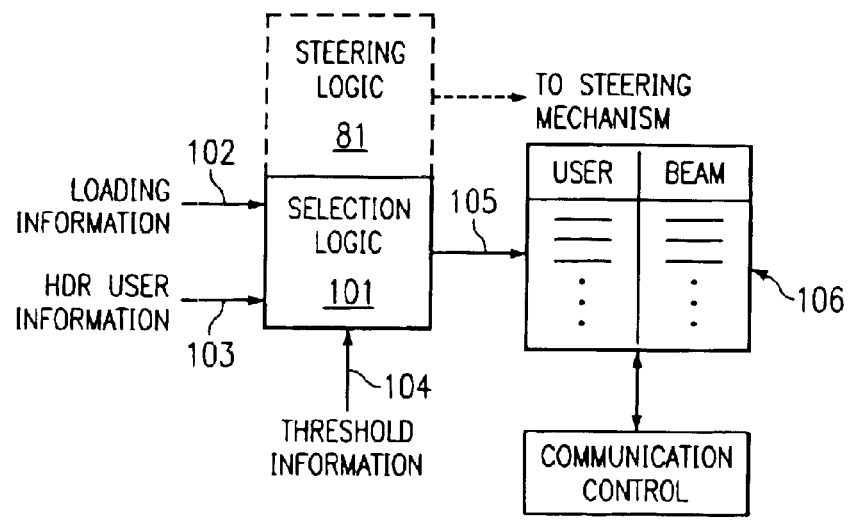

DOWNLINK LOAD SHARING BY BEAM SELECTION

This application is a divisional of U.S. Ser. No. 10/185,746 filed on Jun. 28, 2002, now U.S. Pat. No. 6,667,712, which application is incorporated herein by reference, and which application claims the priority under 35 U.S.C. 119(e)(1) of U.S. Provisional Application No. 60/331,666 filed on Nov. 20, 2001 and also incorporated herein by reference.

FIELD OF THE INVENTION

The invention relates generally to antenna communications and, more particularly, to multi-beam antenna systems.

BACKGROUND OF THE INVENTION

The main objective of conventional radio resource management (RRM) algorithms is to maintain the negotiated (or acceptable) QoS. This may be done by always ensuring coverage and optimizing capacity. One important RRM algorithm is Load Control. If the QoS gets below a threshold, the load control may block new users, delay transmission of data or even drop active users.

In a CDMA system, load control is especially important. It maintains system stability and a reasonable link quality level for existing users. If too many users are admitted to a cell, party effects may occur. This will lead to extensive dropping of users in the cell. Also, neighboring cells may also be affected if the inter cell interference is high. Load Control prevents this and maintains system stability. Common for most load control algorithms is that they set a threshold of the usage of a scarce resource. The scarce resource can be an estimate of power (link or total base station transmit), codes, number of users, throughput, SIR based (e.g. the sum of all users' SIR) and interference level or a combination of these. The estimate can be local (only considering estimates from the associated cell) or can also consider estimates from neighboring sites. The algorithm then admits users as long as the estimate of the scarce resource is not exceeding the threshold.

Generally, conventional adaptive antenna (AA) techniques can be divided into two main categories depending on the type of AA implementation. For a fixed beam (FB) system, there is a set of beams with fixed shape and pointing direction. The second category is a steered or flexible beam implementation where each mobile user has its own beam with adaptive shape and pointing direction, i.e. the beam follows the user as it moves in the cell.

Adaptive antenna techniques can be used to increase the capacity in communication systems, for example a WCDMA system. The spatial dimension used by adaptive antenna concepts enables increased capacity and/or better coverage. FIG. 1 shows an example of how the antenna diagram may look for an adaptive antenna system. In the uplink the C/I is increased and in the downlink the interference is suppressed. Thus, capacity is gained. The inventors have found that in most cases the majority of the downlink interference of a fixed (or steered) multi-beam system for a speech only scenario originates from the main lobe. For example, most of the interference seen by a user connected to the main lobe of beam A in FIG. 1 originates from other users also connected to the main lobe of beam A. However, some sources of interference do not originate from the main lobe of the beam. Examples of such "external" interference sources include:

1) Other cells;
2) Sidelobe of another beam (see FIG. 1); and
3) An overlap area between the aforementioned main lobe and a main lobe of another beam (see FIG. 1).

For a speech only scenario this external interference typically accounts for only a small part of the total interference for each user. However, for users at the cell border, the interference from other cells can be substantial.

However, third generation systems will include not only speech users, but rather a mix of many different services, such as video, web browsing, file transfers and other such high data rate (HDR) services. The inventors have found that the interference from high data rate users outside the main lobe may be substantial in spite of the attenuation between the sidelobe and main lobe. This is because of either a sidelobe or an overlapping beam area. A high data rate user that interferes substantially with the adjacent main lobe of a beam may cause a congestion problem.

Assume, for example, a steered beam adaptive antenna array wherein each beam direction can handle at maximum an equivalent of M speech users. Assume an admission control that operates on per beam direction. The admission control admits up to the maximum level of M users into the beam direction. This can be done e.g., by checking both the number of equivalent speech users "connected" to the beam and/or the interference load on the beam. Consider the example in FIG. 2 with three beams, A, B and C, whose main lobes are directed outwardly from the antenna array in respective radial directions. A high data rate user is admitted access to beam B. Further, assume that the total load in beam B equals exactly M equivalent speech users. However, when the high data rate user connected to beam B moves into the side lobe of beam A it will be affected by the transmit power from the speech users from beam A. Thus, the HDR user will experience increased interference. There is an "interference leakage" between the beams.

The high data rate user must increase its required transmit power due to the new increased interference from the speech users in beam A. The increased transmit power from the high data rate user will in turn affect all other users "connected" or adjacent to beam B. In particular, the increased transmit power from the HDR will increase the interference for all users "connected to" or adjacent to beam B. Assume now that the increased interference corresponds to an equivalent of N1 speech users, so beam B now has M+N1 equivalent speech users. This will very likely result in a very severe and non-acceptable quality problem and a sharp increase of required power from the users, which will lower the total system capacity.

A similar situation may occur due to the overlapping area of main lobes. Once again consider the example in FIG. 2 with only three beams. In beam B a high data rate user is admitted access. When the high data rate user connected to beam B moves into the overlapping area of the main lobes of beams A and B, it will cause, e.g., an interference equivalent of $N_2$ equivalent speech users in beam A. Thus, there is once again an "interference leakage" between the beams.

Conventional congestion control may eventually resolve the above problems by dropping some of the users, but the capacity and quality in the system will be lowered.

Assuming the maximum number of equivalent speech users in each beam is M, another solution may be to set a new admission control level of Q speech equivalents, lower than M, e.g. Q+N=M, where N is the possible external interference (in speech equivalent). This reduces system capacity.

It is therefore desirable to avoid the aforementioned "interference leakage" between beams (e.g. due to the sidelobes and the overlapping areas of main lobes) without degrading the capacity and quality of the system.

The invention exploits the situation wherein the load/interference from an angular perspective is not equal within a cell, and spreads the interference more equally within the cell. This is achieved by judicious use of at least one of nulling, beam steering and beam selection. The load/interference spreading decreases the load in highly loaded areas/directions and increases the load in less heavily loaded areas/directions. The nulling, beam steering and beam selection operations are applicable to coherent adaptive antenna systems, and the beam selection technique is also applicable to fixed beam systems.

BRIEF DESCRIPTION OF THE DRAWINGS

FIG. 4 illustrates exemplary nulling and beam steering operations according to the invention.

FIG. 5 illustrates further exemplary beam steering operations according to the invention.

FIG. 6, taken in conjunction with FIG. 5, illustrates further exemplary nulling and beam steering operations according to the invention.

FIG. 7, taken in conjunction with FIG. 5, illustrates further exemplary nulling and beam steering operations according to the invention.

FIG. 8 diagrammatically illustrates pertinent portions of exemplary embodiments of a base station according to the invention that utilizes a steered, multi-beam antenna arrangement.

FIG. 9 illustrates exemplary beam selection operations according to the invention.

FIG. 10 diagrammatically illustrates pertinent portions of exemplary embodiments of a base station according to the invention that utilizes a multi-beam antenna arrangement.

FIG. 11 illustrates exemplary beam selection operations according to the invention.

DETAILED DESCRIPTION

Figure 1:
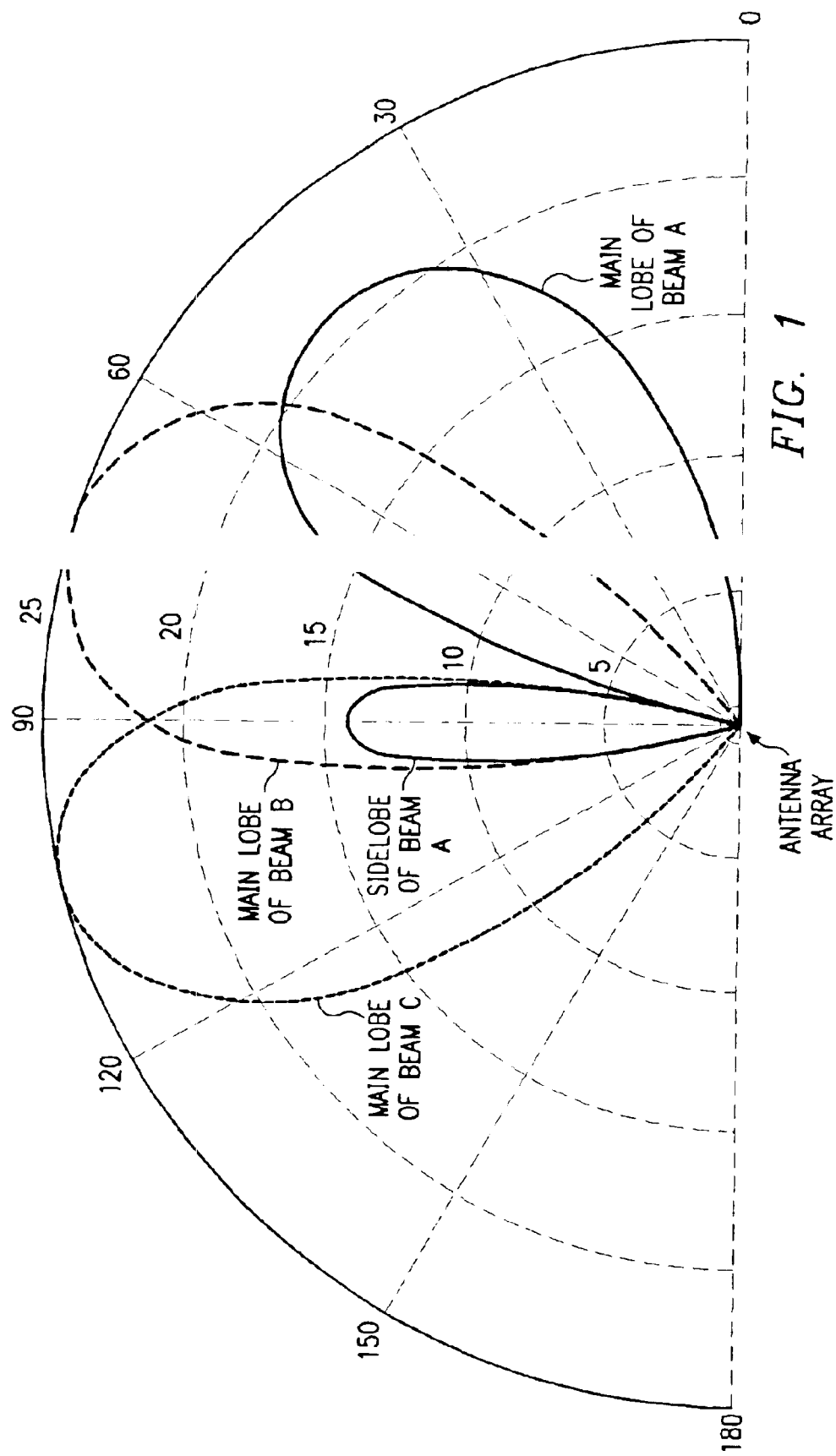
FIG. 1 is an antenna diagram of an exemplary adaptive antenna arrangement with three beams.

A conventional FB system transmits in the beam where most power is received during uplink (UL) transmission. Even though this is optimal for each user, it may not be the best for the overall system. This fact is exploited by the present invention. Due to interference power from overlapping beams or power "leakage" through side lobes, a high data rate (HDR) user may cause much interference to other highly loaded beams and hence cause serious trouble for users allocated to that beam. It does not necessarily need to be a HDR user, any type of user employing high transmit power may cause serious trouble, but is likely to be a HDR user because it generally requires more transmit power than, for example, a speech user, due to its high data rate. The following examples use the term HDR for simplicity, but the invention is not in any way restricted to only handle HDR users per se. Rather, any type of user transmitting with high power and causing high interference for other users, for example, a speech user with an unusually high QoS requirement, is also considered to be an HDR user as that term is used herein. In order to ameliorate the situation in the overloaded beam, as detected by the conventional load control algorithm, it may be beneficial to transmit power from another beam even though this may not be the beam where the most UL power is received. The antenna diagram of this new beam may overlap with the beam where the most UL power is received. Thus, the new beam can have at least some UL received power from the UL transmission of the user.

For a case where a coherent system with "flexible" beamforming is used there are more possibilities than for a FB system. Not only the pointing direction can be changed but also the shape of the beam, e.g. nulls can be generated and steered towards other users. Also here, an HDR user can cause trouble to other users since the high power intended for this HDR user also will hit others due to the beam-width of the main lobe or through side lobe "leakage". In this case there are several options to relieve the situation for a user that experiences high interference levels. For example, the HDR user can point an antenna null towards the interfered user and hence not transmit any power toward that direction (of the interfered user). Generally this can be accomplished by using conventional techniques to change the side conditions when determining the antenna weights for this user. This can be thought of as an ordinary filter where it is possible to change the frequency (here directions) of the stop/pass-band of the filter. When determining the filter coefficients, information from other users, e.g., their quality and direction, can be used in an attempt to relieve the situation for a highly disturbed user. One general idea of the invention is to use this beamforming flexibility of coherent systems not necessarily to optimize the link towards each user (which is the conventional way of using AA), but instead to optimize the overall performance of the system by utilizing the radio resource management in conjunction with AA.

In the downlink, a base station (e.g. for WCDMA cellular telephony) can create a beam pattern with L antenna elements covering the cell area. For each antenna array (i.e., a cell area) it is possible to create a maximum L−1 nulls towards other users/interferers.

Figure 3:
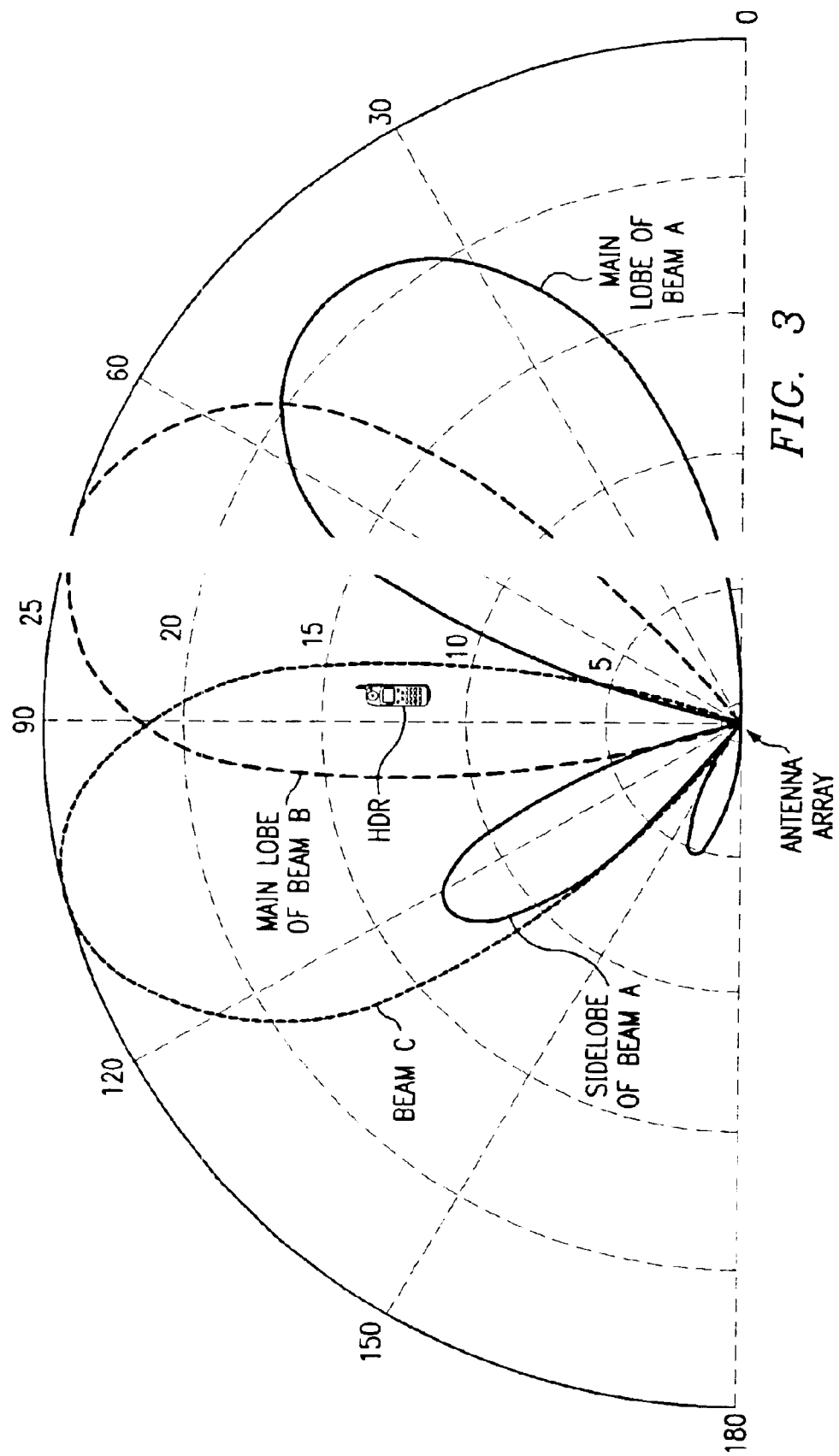
FIG. 3 is an antenna diagram similar to FIG. 1, illustrating exemplary nulling and beam steering operations according to the invention.

When load control detects a situation of excessive load in a direction (e.g, main lobe of beam B in FIG. 3), a nulling mechanism according to the invention can cause, for example, a beam (or beams) in a direction (or directions) adjacent the high load direction to direct nulls toward the highly loaded area. The amount of loading in a given direction can be determined in any desired manner, such as from the interference in the uplink, TPC commands, an SIR target increase, received power at the base station, transmit power from the base station, etc. The nulled energy will appear in the antenna diagram somewhere else. In some embodiments, this nulled energy can be "steered" to a beam with low loading, perhaps beam C. FIG. 3 shows an example of this. Beam A directs null toward the HDR user in beam B. FIG. 3 shows how the antenna diagram can look like after nulling of the sidelobe. In this example, the sidelobe energy of beam A appears in beam C, which is assumed (for this example) to have low loading.

Another exemplary embodiment of the invention steers the main lobes. Assume the main lobes of beams A and B are angularly separated, but overlap each other as shown in FIG. 3. Further assume that users connected to beam A have difficulty maintaining the negotiated quality (e.g. bit rate, FER, delay) due to a considerably high interference/load situation, while users connected to beam B have no problems at all due to low interference/loading. By steering beam B's main lobe away from the main lobe of beam A, the interference may be lowered for users connected to beam A. Beam B will of course need to increase its power consumption due to the non-optimal beam direction that results from steering beam B away from its current position. This shares (distributes) the load over the cell. In some embodiments, this load sharing by beam steering will only take place if it is certain that beam B can still maintain the required quality level after being steered away from beam A (i.e., only if beam B has relatively low interference/loading).

Figure 2:
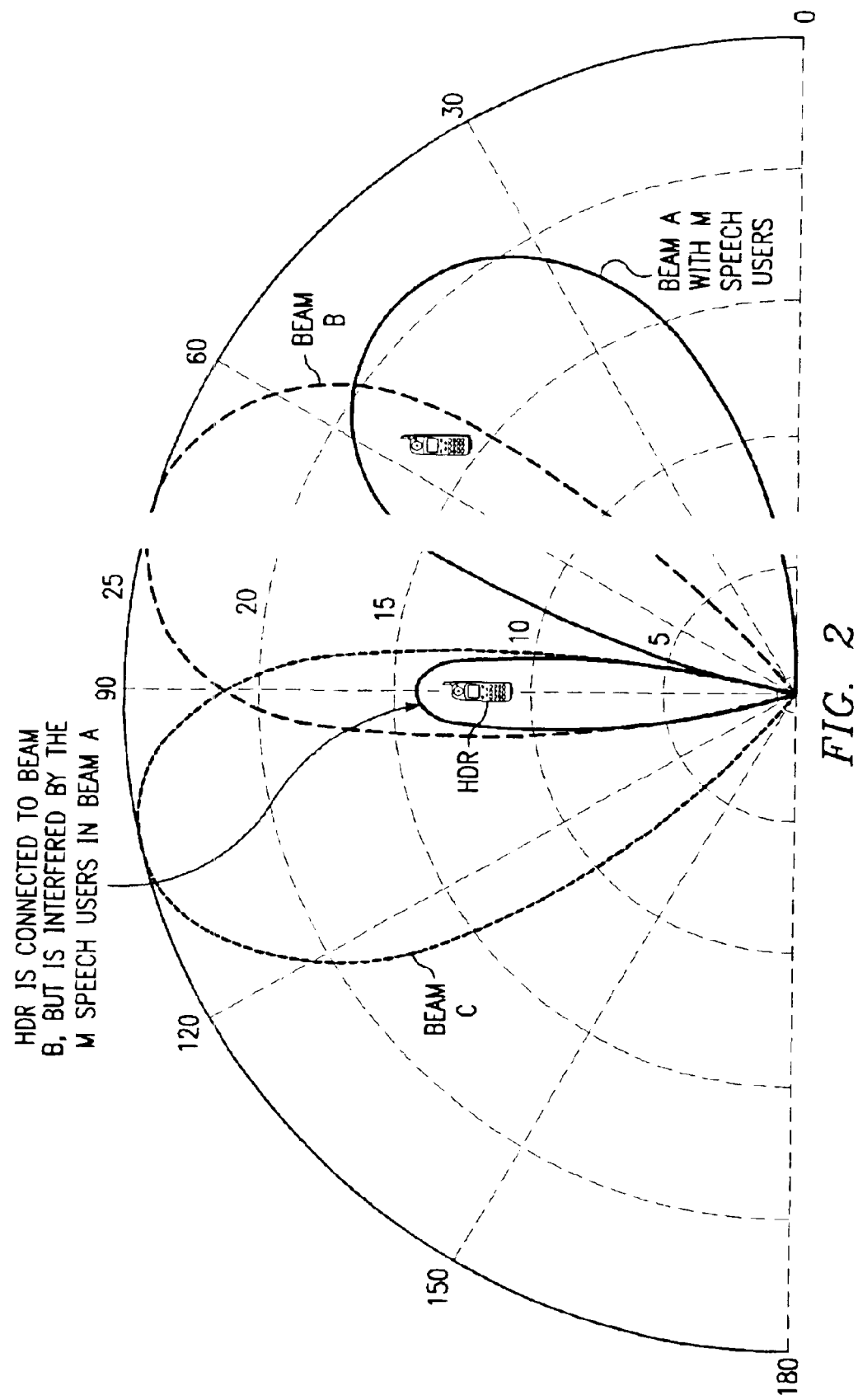
FIG. 2 is an antenna diagram similar to FIG. 1, illustrating an interference problem associated with the arrangement of FIG. 1.

Consider once again the simple three beam case as in the example of FIG. 2, but this time with a high load in beam A. The HDR user in beam B would normally be connected to beam B. However, if a high loaded situation is detected in beam A, some embodiments may select beam C instead for transmission to the HDR user. This may be non-optimal for the HDR user, but may also resolve the high load situation in beam A. Thus, from a system perspective this may be optimal and increase capacity. Also, if beam B (which the HDR user would normally be connected to) has a high load situation, any adjacent beam with low load may be used for transmission to the HDR user, e.g. beam C in this example.

FIG. 4 illustrates exemplary operations according to the present invention. At 41, the invention identifies a beam whose main lobe is overloaded. For this identification, any suitable interference/loading indicator can be utilized, for example one of the indicators mentioned above. The overloaded condition can be determined by comparing a selected interference/loading indicator to a corresponding threshold. The threshold can be determined, for example, empirically based on experimentation/simulation under expected operating conditions and in view of desired performance. (All overload and underload conditions described herein can be determined, for example, in this same general fashion.) At 42, the null(s) of one or more other (e.g. adjacent) beams is/are steered in the main lobe direction of the overloaded beam. In some embodiments, shown by broken line in FIG. 4, the sidelobe(s) of the one or more other beams is/are steered in the main lobe direction(s) of one or more underloaded beams. An underloaded beam can be, for example, a beam with more available communication capacity than the main lobe of the overloaded beam. Again, any suitable interference/loading indicator can be used for the underloaded determination, and a suitable threshold can be empirically determined from experimentation/simulation in generally the same manner described above.

FIG. 5 illustrates further exemplary operations according to the invention. At 51, a beam having an overloaded main lobe is identified, together with one or more beams whose main lobe(s) overlap the main lobe of the overloaded beam. It is determined at 52 whether the main lobe of any of the overlapping beams is underloaded. If not, operations return to 51. Otherwise, the main lobe(s) of the underloaded, overlapping beam(s) is/are steered away from the main lobe of the overloaded beam at 53.

FIG. 6, taken together with FIG. 5, illustrates further exemplary operations according to the invention. In particular, if it is determined at 52 in FIG. 5 that there are no underloaded overlapping beams, then the null(s) of the overlapping beam(s) is/are steered at 61 in the main lobe direction of the overloaded beam. Thereafter, operations return to 51 in FIG. 5. In some exemplary embodiments, shown by broken line in FIG. 6, the sidelobe(s) of the overlapping beam(s) is/are steered at 62 in the main lobe direction(s) of one or more underloaded beam(s).

FIG. 7, taken together with FIG. 5, illustrates further exemplary operations according to the invention. After the above-described steering operation at 53 in FIG. 5, the null(s) of the underloaded, overlapping beam(s) is/are steered at 71 in the main lobe direction of the overloaded beam. Thereafter, operations return to 51 in FIG. 3. In some embodiments, as shown by broken line in FIG. 7, the sidelobe(s) of the underloaded, overlapping beam(s) is/are steered at 72 in the direction(s) of the main lobe(s) of one or more further underloaded beams.

In some embodiments, the threshold level used to make the underloaded determination at 52 in FIG. 5 is a lower level of interference/loading than the threshold level used to make the underloaded determination at 43, 62 and 72 in FIGS. 4, 6 and 7, respectively. In such embodiments, it is not desirable to steer the underloaded, overlapping beam away from the overloaded beam (at 53 in FIG. 5) unless the interference/loading associated with the underloaded, overlapping beam is sufficiently low that the users connected thereto are not expected to experience a degradation in communication quality due to the re-positioning of the beam. To ensure a sufficiently low interference/loading level in the underloaded, overlapping beam, the threshold level used to make the underloaded determination can, in such embodiments, be set low enough to permit a margin of safety with respect to the communication quality associated with the beam after the re-positioning of the beam.

FIG. 8 diagrammatically illustrates pertinent portions of exemplary embodiments of a base station (e.g. for CDMA or WCDMA cellular telephony) according to the invention, including a steerable multi-beam antenna arrangement (e.g., a coherent system) capable of producing beam patterns such as illustrated generally in FIGS. 1–3. The base station of FIG. 8 includes steering logic 81 for performing operations illustrated in FIGS. 4–7 in response to loading information received at an input 82 and threshold information received at an input 83. The steering logic 81 outputs a signal 84 to a steering mechanism of the antenna arrangement. The signal 84 is indicative of the desired steering (including nulling) operation(s), and the steering mechanism 85 can use conventional techniques to steer the antenna array 86 as instructed by the signal 84.

FIG. 9 illustrates further exemplary operations according to the invention. At 91, a first beam whose main lobe is overloaded is identified. At 92, an HDR user in an area covered by the main lobe of a second beam adjacent or overlapping the first beam is identified. At 93, a further beam whose main lobe is underloaded (e.g. has more available communication capacity than the main lobe of the first beam) is selected for communication with the HDR user.

FIG. 11 illustrates further exemplary operations according to the invention. At 111, an HDR user is identified in an area covered by a first beam whose main lobe is overloaded. At 112, a second beam that is adjacent or overlapping the first beam, and whose main lobe is underloaded (e.g, has more available communication capacity than the main lobe of the first beam), is selected for communication with the HDR user.

FIG. 10 diagrammatically illustrates pertinent portions of a base station (e.g. for CDMA or WCDMA cellular telephony) according to the invention, including a multi-beam antenna arrangement (e.g., an FB system or a coherent system) capable of producing beam patterns such as illustrated generally in FIGS. 1–3. In FIG. 10, selection logic 101 receives loading information at input 102 and HDR user information at input 103. The HDR user information includes information which identifies the user as an HDR user, and also identifies the area of the cell in which the HDR user is currently located. Such HDR user information is readily available in conventional cellular communication systems. The selection logic 101 also has an input 104 for receiving threshold information for use in making the underloaded and overloaded determinations of FIG. 9 or 11. The selection logic 101 has an output 105 coupled to a user-to-beam correlation database or look-up table 106. In response to its inputs 102–104, the selection logic 101 can perform the exemplary operations of FIG. 9 or 11 and update the database 106 to reflect the beam to which the HDR user has been assigned by operation of the selection logic 101. A communication control portion of the base station can utilize the database 106 in conventional fashion such that communication with a given HDR user is carried out via the beam that the selection logic 101 has selected for that HDR user.

As shown by broken line in FIG. 10, embodiments that utilize a coherent adaptive antenna system can include the selection logic 101 and the steering logic 81 of FIG. 8, thereby permitting beam selection operation and/or nulling/steering operation.

It will be evident to workers in the art that the embodiments of FIGS. 1–10 can be readily implemented, for example, by suitably modifying software, hardware or a combination of software and hardware in conventional base stations which utilize multi-beam antenna arrangements, for example multi-beam CDMA or WCDMA base stations.

Although exemplary embodiments of the invention are described above in detail, this does not limit the scope of the invention, which can be practiced in a variety of embodiments.

What is claimed is:

1. A method of managing loading in a beam pattern associated with a multi-beam antenna array, comprising:

receiving first information which indicates that a first beam of the beam pattern is overloaded;

receiving second information which indicates that a user is located in an area covered by a second beam which is adjacent to the first beam in the beam pattern; and in response to said first and second information, selecting a third beam of the beam pattern for effectuating communication with the user.

2. The method of claim 1, wherein the third beam has more available communication capacity than the first beam.

3. The method of claim 1, wherein the user causes more interference to another user than said another user causes to the first-mentioned user.

4. The method of claim 3, wherein the first-mentioned user is a user of one of a video service, a web browsing service, a file transfer service and a speech service.

5. The method of claim 1, wherein the second beam spatially overlaps the first beam.

6. An apparatus for managing loading in a beam pattern associated with a multi-beam antenna array, comprising:

an input for receiving first information which indicates that a first beam of the beam pattern is overloaded, and for receiving second information which indicates that a user is located in an area covered by a second beam which is adjacent to the first beam in the beam pattern; and a selector coupled to said input and responsive to said first and second information for selecting a third beam of the beam pattern for effectuating communication with the user.

7. The apparatus of claim 6, wherein the third beam has more available communication capacity than the first beam.

8. The apparatus of claim 6, wherein the user causes more interference to another user than said another user causes to the first-mentioned user.

9. The apparatus of claim 8, wherein the user is a user of one of a video service, a web browsing service, a file transfer service and a speech service.

10. The apparatus of claim 6, provided in one of a CDMA base station and a WCDMA base station.

11. The apparatus of claim 6, wherein the multi-beam antenna array is a fixed beam (FB) array.

12. The apparatus of claim 6, wherein the second beam spatially overlaps the first beam.

* * * * *